United States Patent Office 3,257,439
Patented June 21, 1966

3,257,439
DIPHENYL THIOPHENYL ARSINE
Raffaello Fusco, Cesare Augusto Peri, and Vittorio Corradini, Milan, Italy, assignors to Montecatini Societa Generale per l'Industria e Chimica, Milan, Italy
No Drawing. Filed July 30, 1962, Ser. No. 213,102
Claims priority, application Italy, Aug. 3, 1961, 14,327/61
1 Claim. (Cl. 260—440)

This invention relates to a sulfur arsenium compound which is especially suitable for use as a pesticide, viz. insecticide, and also as fungicide.

It is common knowledge that not all of the numerous pesticides and fungicides now in common use are entirely satisfactory in respect to both inhibitory and destructive activities. Moreover, some of these compounds have a degree of toxicity towards warm-blooded animals which is not tolerable.

The main object of this invention is to provide a new pesticidal compound, which compound has higher inhibiting and destructive activity against fungi and moulds than compounds known to date.

Another object is to provide a fungicidal compound having tolerable toxicity toward warm-blooded animals.

A further object of the invention is to provide a compound which can conveniently be associated with the substances commonly used in the formulation of pesticidal compositions, such as solvents, emulsifiers, wetting agents, inert powders, anti-foaming agents, etc.

These and still other objects are attained advantageously by application of the pesticidal and fungicidal compound of the instant invention.

This new product is conveniently prepared by reacting a phenylhaloarsine of the following formula:

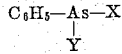

in which X is a halogen, Y is a phenyl radical, with alkaline mercaptides of the general formula:

$$R_1SMe$$

in which $R_1$ is a phenyl radical, and Me is an alkaline metal, in the presence of an organic solvent capable of dissolving the reactants.

The general reaction scheme is as follows:

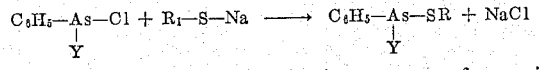

The reaction is carried out in the presence of organic solvents, preferably ethanol, methanol or acetone. The reaction is in general carried out at a temperature from or between 0° and 30° C. The reaction product is thereafter isolated by the methods normally employed in organic chemistry, for example by addition of water or by evaporation of the solvent. It can be further purified by crystallization from suitable solvents, such as methanol, ether, ligroin, and acetic acid.

The compound which is an object of the present invention has a high activity against fungi and moulds.

The toxicity toward warm-blooded animals is within limits for practical use of these products. The results of two toxicity studies follows:

Phenyldithiobenzylarsine: LD 50 per os on white mouse=318 mmg./kg.
Phenyldithiophenylarsine: LD 50 per os on white mouse=78 mmg./kg.

The product is a crystalline or oily substance insoluble in water and soluble in most of organic solvents. It can conveniently be formulated by associating it with the substances which are commonly used in the formulation technique such as solvents, emulsifiers, wetting agents, dispersants, inert powders, and anti-foaming agents. It can also be associated in the same formulations with other types of substances having pesticidal activity.

Powders suitable for dry dusting can conveniently be prepared by admixing 3 parts by weight of the compound

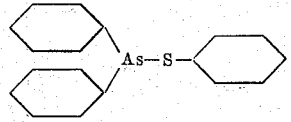

with 97% of talc.

The following example illustrates the invention, without intent to limit its scope.

EXAMPLE 1.—DIPHENYL THIOPHENYL ARSINE

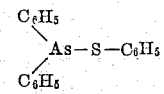

150 cc. of absolute ethanol and 4.6 g. of metallic sodium are introduced into a 1000-cc. flask. When the sodium has dissolved, 22 g. of thiophenol are added at 20–25° C. A previously prepared solution of 52 g. of diphenyl chloroarsine in 200 cc. of absolute ethanol is then added at the same temperature.

The solution is refluxed for 5 minutes and is then cooled, and 500 cc. of water and 100 cc. of $CCl_4$ are added. The organic layer is washed first with a dilute NaOH solution, then with water, and is finally concentrated under vacuum. The residue consists of 62 g. of a thick yellow oil which upon crystallization yields 44 g. of a product having a melting point of about 40° C.

As found: 23.05% (calculated 22.13%). S found: 9.54% (calculated 9.48%).

*Evaluation of the capacity of the product to inhibit the growth and diffusion of fungine mycelium.*

(1) Three porcelain cups, each containing 0.025 cc. of a solution having a known content of the product to be examined, are placed on the surface of Petri dishes having a diameter of 10 cm., the dishes being coated previously with agar-agar and seeded with the four test fungi. After incubation in a thermostat at 25° C. for 72 hours, the haloes, due to inhibition of fungine growth on the agar-agar surface, were determined, namely the distance between the outer edge of the cup and the point where the test fungus begins to grow was determined. The results of the evaluations of the products under examination are reported in Table A, expressed in mm.

(2) Three small filter-paper disks of 1 cm. diameter are impregnated with solutions of the products under examination, (0.05 cc.) with a known active product content, and left to dry. The small disks are then placed on the surfaces of Petri dishes of 10 cm. diameter, the surfaces being coated previously with agar-agar and seeded with the four test fungi. After incubation in a thermostat at 25° C. for 72 hours, the haloes of inhibition of fungine growth around the disks are determined by measuring, on the agar-agar surface, the distance between the disk edge and the point at which the test fungus begins to grow, expressed in mm. (Table B).

(3) The antifungal activity of the products which are hardly or insufficiently diffusible in solid agar-agar is determined by incorporating the solution of the product to be examined in the nutritive substratum in the following ratio: 1 cc. of solution plus 9 cc. of agar-agar in each Petri dish having a 10 cm. diameter. The inoculation of the test fungus is carried out by means of streaks made with a suspension of spores and mycelium in sterile twice distilled water onto the agar-agar coated surface. Determination is then made of the dose of the substance under examination at which there is a total inhibition of the growth of fungine mycelium, after incubation in a thermostat at 25° C. for 72 hours, said dose being expressed as percent of active substance (Table C).

TABLE A.—PORCELAIN CUP METHOD

| Product | Concentr. a.s., Percent | Inhibition haloes in mm. on— | | | |
|---|---|---|---|---|---|
| | | Alternaria tenuis N. | Aspergillus niger T. | Penicillium roquef. T. | Sacc. ell. H. |
| Diphenyl thiophenyl arsine | 1.0 | 24 | 15 | 18 | 11 |
| | 0.2 | 15 | 7 | 8 | 6 |
| | 0.04 | 2 | 0 | 1 | 2 |
| | 0.008 | -------- | -------- | -------- | -------- |

TABLE B.—FILTER-PAPER DISK METHOD

| Product | Concentr. a.s., Percent | Inhibition haloes in mm. on— | | | |
|---|---|---|---|---|---|
| | | Alternaria tenuis N. | Aspergillus niger T. | Penicillium roquef. T. | Sacc. ell. H. |
| Diphenyl thiophenyl arsine | 1.0 | 18 | 14 | 15 | 7 |
| | 0.2 | 10 | 7 | 8 | 3 |
| | 0.04 | 1 | -------- | 1 | 1 |
| | 0.008 | -------- | -------- | -------- | -------- |

TABLE C.—STREAKS METHOD

| Product | Alternaria tenuis N. | Aspergillus niger T. | Penicil. roquef. T. | Sacchar. ell. H. |
|---|---|---|---|---|
| Diphenyl thiophenyl arsine | 0.2 | 0.04 | 0.04 | 0.04 |

We claim:
The compound of the formula:

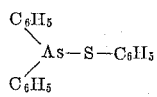

References Cited by the Examiner

UNITED STATES PATENTS

| Re. 16,921 | 4/1928 | Kharasch | 260—440 |
| 2,516,831 | 7/1950 | Rohrmann | 260—440 |
| 2,566,382 | 9/1951 | Sweet et al. | 260—440 |
| 2,701,812 | 2/1955 | Takahashi et al. | 260—440 |
| 2,767,114 | 10/1956 | Urbschat et al. | 260—440 |
| 2,768,192 | 10/1956 | McLeod | 260—440 |
| 2,901,393 | 8/1959 | Magner | 167—30 |
| 2,967,799 | 6/1961 | Wehner | 167—30 |

FOREIGN PATENTS 1,094,746  12/1960  Germany.

OTHER REFERENCES

Zhurnal Obshchei Khimii, vol. 31, November 1961, pp. 3554–3556.

TOBIAS E. LEVOW, *Primary Examiner.*

JULIUS S. LEVITT, *Examiner.*

G. A. MENTIS, E. C. BARTLETT, F. R. OWENS,
*Assistant Examiners.*